(No Model.)
J. MILLS.
BELT GUIDE AND TIGHTENER.
No. 256,913. Patented Apr. 25, 1882.
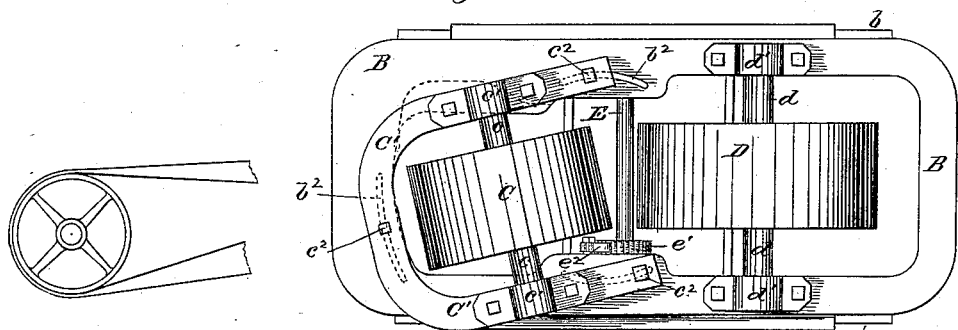
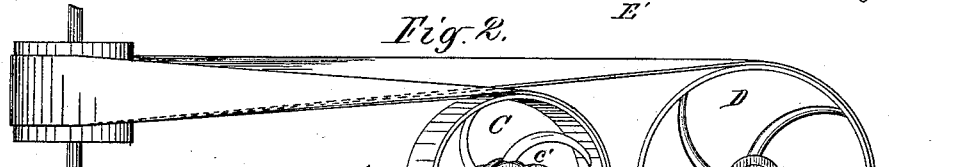
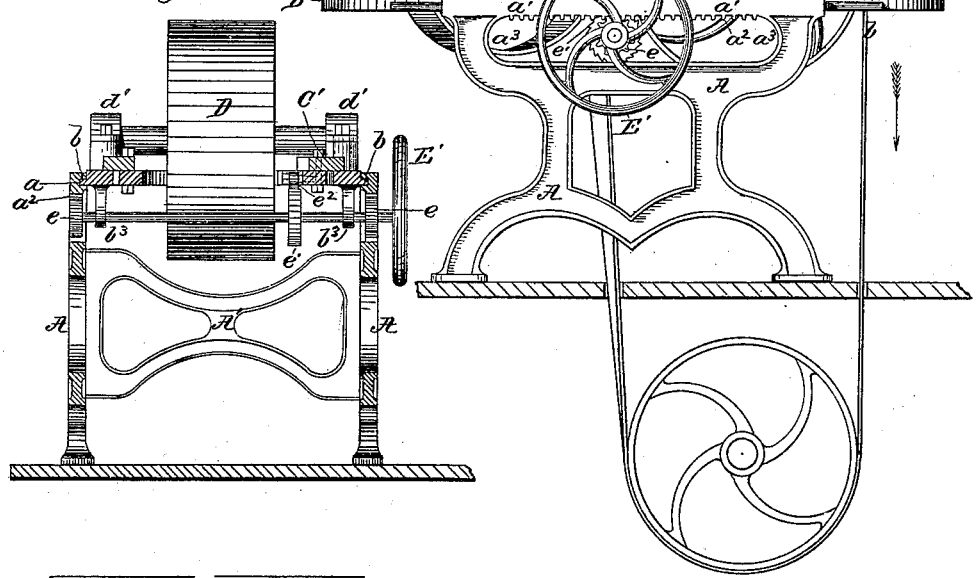
WITNESSES
F. W. Adams
W. C. Adams
INVENTOR
Jonathan Mills
per M. E. Dayton
Attorney

UNITED STATES PATENT OFFICE.

JONATHAN MILLS, OF CHICAGO, ILLINOIS, ASSIGNOR OF THREE-FOURTHS TO SAMUEL S. CHISHOLM AND WELLINGTON P. CHISHOLM, BOTH OF SAME PLACE.

BELT GUIDE AND TIGHTENER.

SPECIFICATION forming part of Letters Patent No. 256,913, dated April 25, 1882.

Application filed January 4, 1882. (No model.)

*To all whom it may concern:*

Be it known that I, JONATHAN MILLS, of Chicago, in the county of Cook and State of Illinois, have invented certain new and useful Improvements in Belt Guides and Tighteners; and I do hereby declare that the following is a full, clear, and exact description thereof, reference being had to the accompanying drawings, and to the letters of reference marked thereon, which form a part of this specification.

The object of this invention is primarily to provide means for transmitting power by a belt from a horizontal driving-shaft located beneath a floor to a vertical shaft above the floor, and also to provide in the same mechanism for tightening the belt, trained as will be described.

The precise nature of the invention will more fully appear from the following description and claims.

In the drawings, Figure 1 is a plan or top view of the belt guide and tightener. Fig. 2 is a side elevation of the same, shown in connection with the driving-pulley from which the power is taken, and the belt therefrom trained over the pulleys of the guide and tightener to the pulley of the vertical shaft to be driven. Fig. 3 is a transverse vertical section of the guide and tightener.

L represents the floor upon which the belt-guiding machine rests.

M is a driving-pulley on a horizontal shaft, M', located beneath the floor, and N is a belt by which power is to be transmitted from the pulley M to a pulley, P, on a vertical shaft, P', located above the floor. In the belt guiding and tightening mechanism a fixed frame is provided, upon which two pulleys are mounted in a movable part, one of said pulleys having its bearings fixed on said part and the other having its bearings adjustable, whereby the angle of one pulley with the other may be varied at pleasure.

A A are parallel uprights, and A' is a cross-brace of the main guide-frame intended to be secured to the floor L.

B is an oblong open pulley-frame, provided with parallel marginal guide-flanges $b$, which are fitted to slide in horizontal grooves in the inner faces of the top bar, $a'$, of the frame-uprights A. D is the larger and C is the smaller of two guide-pulleys over which the belt is trained in the direction indicated in Fig. 2. The pulley D has its shaft $d$ mounted in fixed bearings on the frame B. The pulley C has its shaft $c$ mounted in bearings $c'$, secured upon the movable U-shaped frame C'. The latter or frame-piece C' is adapted to be secured adjustably upon the main pulley-frame B by means of clamping-bolts $c^2$, which pass through C' and through curved slots $b^2$ in the frame B. The object of this adjustment of the frame-piece C', last mentioned above, is to allow the pulleys C and D to be set at any desired angle with each other with reference to the size and distance of a pulley, P, upon a vertical shaft over which the belt N is to pass, wherefore the slots $b^2$ are preferably curved in circles about a point in or near the inner face of the adjustable pulley C. In the drawings such point is taken at the middle of the inner face of said pulley. The pulley C will ordinarily be required to set at some inclination with the pulley D, in the direction shown in the drawings, though the angle of inclination in this direction will need to be varied according to the situation of the machine; but, if desired, it may be inclined in the opposite direction or set in line with the pulley D. To provide for an equal inclination of the pulley C at both sides of a line with D, the frame B will be cut out equally on both sides, as shown by dotted lines in Fig. 1, to allow room for the pulley to swing.

For the purpose of sliding the frame B with its pulleys C and D horizontally, said frame is provided with pendants $b^3$, carrying a shaft, E, having pinions $e$, which mesh with the rack $a^2$ on the under faces of the frame-bars $a'$. A hand-wheel, E', enables the operator to apply the required power to the pinion-shaft E, and a ratchet, $e'$, on said shaft and pawl $e^2$ on the frame B, arranged as plainly shown in Fig. 1, hold the pulley-frame in the desired position. The frame A is open at $a^3$ beneath the rack $a^2$, to give passage to the shaft E, and all necessary movement of said shaft E in the operation just described. By means of the U-shaped frame C' connecting the opposite bearings $c'$ of the pulley C said bearings are retained in line when the angle of the pulley is changed, making the adjustment of said pulley a very simple matter. The mode of training the belt N from the pulley M over the guide-pulleys C and D to the pulley P on the upright shaft P' is indicated in Fig. 2.

It is plain that a movement of the pulley-frame B in its horizontal bearings in a direction away from the shaft P' operates upon both the advancing and the receding portions of the belt N to tighten the same, and that in tightening the belt these parts of the latter are never brought into contact. As a consequence, a belt originally of suitable length will never require to be shortened, but may be tightened, as occasion may require, without disturbing the relative positions of the pulleys C and D.

While the device shown will ordinarily be used for the double purpose of deflecting a belt from a horizontal shaft beneath to a vertical shaft above a floor, it may obviously be used for deflecting both advancing and receding parts of the belt when trained over pulleys of two horizontal shafts in the same relative positions as those shown. In that case the pulleys C and D will be set with their axes parallel, and the tightening function will remain the same as described.

I claim as my invention—

1. In a belt guide and tightener, the combination of the frame A, adapted to be secured to the floor, the pulley-frame B, arranged to slide horizontally upon the frame A, and the pulleys C and D, mounted on the frame B, together with means for adjusting and securing said frame B, all for the purpose of deflecting a belt from one shaft to another, when located in the relative positions shown, substantially as described.

2. The combination, in a belt-guide, of the frame A, provided with the loose pulleys C and D, arranged as shown, the former being smaller than the latter, and set or adapted to be set at an angle with the former, substantially as and for the purpose set forth.

3. In a belt-guide and tightener, the combination of the frame A, provided with a rack, $a^2$, the pulley-frame B, fitted to slide in the frame A, the shaft E, provided with a pinion fitted to the rack $a^2$, and the ratchet $e'$ and pawl $e^2$, arranged and operating substantially as described.

4. In a belt-guide, the combination, with the pulley D, of the pulley C, having its shaft-bearings adjustable, whereby the angle of its inclination may be varied at will, substantially as described.

5. In a belt-guide, the combination, with the pulley D, of the pulley C, having its shaft-bearings connected by the frame-piece C', adapted to be adjustably secured in place, substantially as described.

6. In a belt guide and tightener, the combination, with the separate frame-piece C', carrying the pulley C, of the sliding frame B, provided with slots $b^2$, and carrying the relatively-fixed pulley D, substantially as described.

In testimony that I claim the foregoing as my invention I affix my signature in presence of two witnesses.

JONATHAN MILLS.

Witnesses:
M. E. DAYTON,
JESSE COX, Jr.